United States Patent [19]

Smith

[11] 4,455,459

[45] Jun. 19, 1984

[54] FOUR-WAY ELECTRICAL SWITCH

[75] Inventor: Robert J. Smith, Farmington Hills, Mich.

[73] Assignee: Chivas Products Ltd., Sterling Heights, Mich.

[21] Appl. No.: 324,078

[22] Filed: Nov. 23, 1981

[51] Int. Cl.³ .................... H01H 9/00; H01H 19/00; H01H 25/00
[52] U.S. Cl. ................................. 200/5 R; 200/1 V; 200/6 A; 200/17 R
[58] Field of Search ............. 200/1 V, 5 R, 5 A, 6 R, 200/6 A, 17 R, 18

[56] References Cited

U.S. PATENT DOCUMENTS

4,128,744 12/1978 Seeger .................................. 200/5 A
4,315,113 2/1982 Fisher et al. .................... 200/6 A X
4,356,357 10/1982 Fisher ................................. 200/1 V

Primary Examiner—J. R. Scott
Attorney, Agent, or Firm—Townsend and Townsend

[57] ABSTRACT

A four-way electrical switch having a die-cast, metal housing, a set of fixed-contacts disposed in the base of said housing and a central movable-contact assembly disposed within the housing above the fixed-contacts. The die-cast housing serves as a ground contact for the switch. Various provisions are disclosed for assuring good electrical connection between the contacts. Additionally, a mechanical strain relief structure is disclosed.

36 Claims, 21 Drawing Figures

FOUR-WAY ELECTRICAL SWITCH

BACKGROUND AND SUMMARY OF THE INVENTION

Four-way switches are well known in the art which use a housing and a central movable-contact assembly which registers with a lower fixed-contact assembly. Such switches are typically used to operate a pair of adjustment motors for an electrically-adjusted vehicle mirror. In a typical prior art construction, the movable-contact assembly comprises a handle, a pivotable rocker member, four orthogonally disposed contact pins projecting downwardly from the rocker, and a spring-loaded contact on each pin. The movable-contacts register with four corresponding fixed output contacts in a base and thus are themselves orthogonally disposed. A first power contact is central to the fixed output contacts and a second power contact of annular configuration surrounds the four fixed output contacts. In the prior art structure, the first or central power contact is connected to battery negative and the second or surrounding annular contact is connected to battery positive. Upon movement of the handle, the rotor pivots to move two of the four movable-contacts from sole engagement with respective ones of the four fixed output contacts so that the base of one movable-contact bridges one fixed output contact and the central power contact and so that the base of the other movable-contact bridges the diagonally-opposed fixed output contact and the annular power contact. Thus, the source of electrical power is connected to the selected two of the fixed output contacts whereby an adjustment motor connected to those contacts may be driven by the source of power. If the handle is moved in an orthogonal direction, the other two movable-contacts are caused to bridge the other two fixed output contacts to the central power contact and the outer annular power contact, respectively. Since there are four directions of movement of the handle, there are four unique connections of the contact members allowing each of two adjustment motors to be connected to the power supply with two different polarities of connection to be thereby driven in two directions.

The present switch is a four-way switch generally of the above design. However, there are important differences as will be described.

One important feature of the present invention is the utilization of a die-cast housing to form one of the power contacts, and particularly, the ground contact of the switch. By this means, the provision of a separate ground contact is avoided. To facilitate the use of the die-cast housing as a contact of the switch, several important advances have been made. For example, the die-cast housing is designed so that the movable-contacts are caused to engage the die-cast housing substantially above the base of the movable contact. Additionally, the die-cast housing has been provided with a pair of projections forming a V-shaped valley between the projections which receives the movable-contact when it makes engagement with the housing. The valley is so configured with respect to the diameter and configuration of the movable-contact so that the movable-contact will be biased into electrical engagement with the housing at two points with a sliding motion. By providing two points of contact, a redundant point of contact is established. Additionally, the sliding motion provides a wiping action which reduces the buildup of insulating oxide on the respective engaging surfaces of the contacts. Additionally, a clearance between the contact pins and the movable-contact is established which allows a slight rocking action of the contact on the pin so as to assure that the contacts do not lift off of the fixed-contact surfaces when a greater than normal operating force is applied to the operating handle.

The present switch has several other novel features. For example, a contact insulating member is provided with guideways for the movable-contacts which assure that the movable-contacts move along a path defined by the guideways during operation of the switch. Additionally, a printed circuit board is provided which incorporates several important features. Firstly, the fixed-contacts are disposed on the upper surface of the circuit board and electrically connected to a conductive foil in a circuit pattern on the lower surface of the circuit board. A wiring harness for connection of the switch to the adjustment motors is also electrically connected to the conductive foil of the circuit board. Furthermore, the circuit board mounts and interconnects a double-pole, double-throw switch which is used to select either the right or left mirror of the vehicle. As a further feature of the invention, provision is made for grounding the circuit board directly to the die cast housing by providing a shoulder on the die cast housing which engages the conductive foil on the lower surface of the circuit board. As a still additional feature of the present invention, a novel mechanical strain relief is provided in the form of an offset between adjacent passages for the conductors which clamps the conductors when the switch is assembled.

An alternate embodiment is disclosed which provides two points of contact between each movable switch contact and the central supply contact. The alternate embodiment also provides two points of contact between each movable switch contact and the fixed output contacts. This is accomplished by providing the central supply contact with a cruciform shape and the fixed output contacts with a dished upper surface. Of course, the two points of contact in each instance enhances the reliability of the switch of the present invention.

BRIEF DESCRIPTION OF THE DRAWINGS

FIG. 18 is a view of an alternative embodiment of a portion of the switch according to the present invention.

BRIEF DESCRIPTION OF THE PREFERRED EMBODIMENTS

Figure 1:
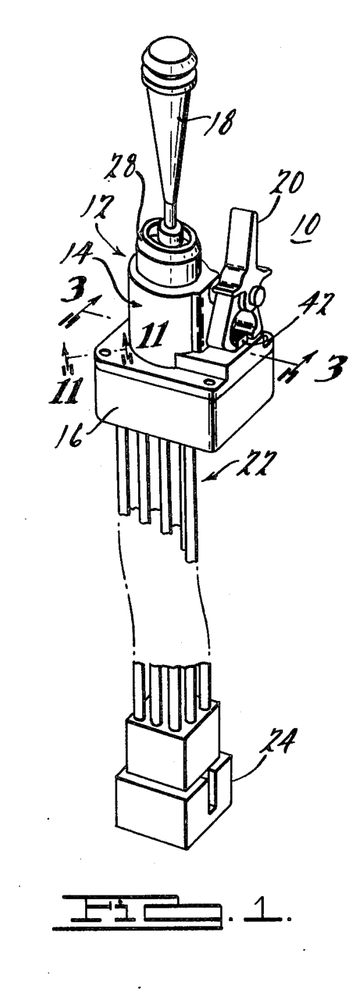
FIG. 1 is a perspective overall view of an assembled switch according to the present invention.

In FIG. 1, a switch 10 in its assembled state is illustrated. The switch 10 comprises a housing 12 having an upper housing 14 and a lower housing 16, an operating handle 18 and a selector switch 20 having an operating lever 21. A plurality of conductors 22 extend from the housing to a snap connector 24. The switch 10 is a four-way switch adapted, for example, for operating a pair of adjustment motors in electrically-adjustable side view mirrors for vehicles. There are many other applications for such four-way switches, and consequently, this invention is not limited to any particular application.

The particular switch 10 is adapted to operate a pair of electrically-adjustable mirrors through the provision of a double-pole, double-throw selector switch 20 which can connect the switch 10 to the the left or right vehicle mirror.

Figures 1B, 2:
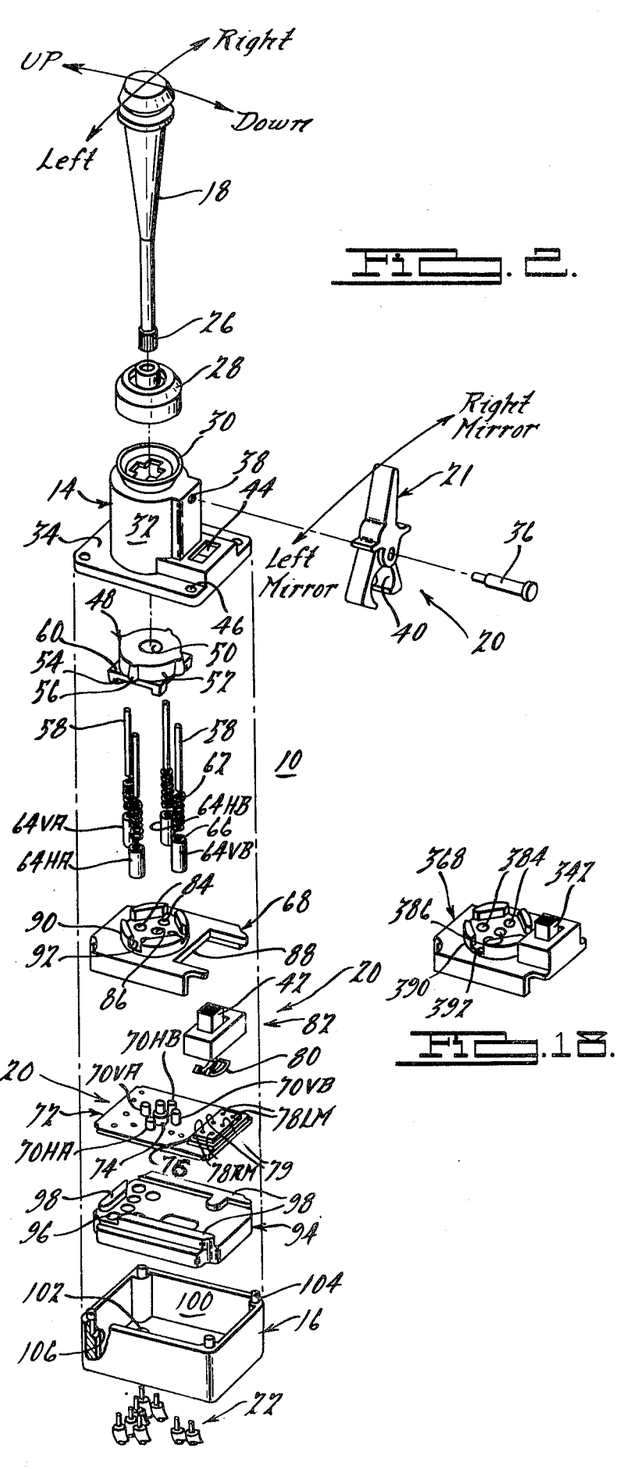
FIG. 2 is an exploded, perspective view of a switch according to the present invention.

In FIG. 2, the component parts of the switch 10 can be best seen. Starting from the top of the Figure, the operating handle 18 is illustrated. Note that the bottom portion 26 of the operating handle 18 is provided with axial serrations. The operating handle 18 projects through a boot 28 of elastomeric material, for example, neoprene or rubber. The boot is snapped over an upwardly and outwardly extending flange 30 on the upper housing 14. The upper housing 14 is die cast of an electrically-conductive material such as zinc and includes an upper barrel portion 32 and a lower rectangular cover portion 34. The upper housing 14 will be described in greater detail hereinafter. The selector switch operating lever 21 is secured to the upper housing 14 by means of a pivot pin 36 which is driven into a radial bore 38 in the cylindrical portion 32. The selector switch lever 21 has a wishbone configuration, i.e., with its lower portion bifurcated to form lower legs 40 which embrace a sliding handle 42 of the selector switch 20. The sliding handle 42 projects through a rectangular opening 44 in the cover portion 34 of the upper housing 14. The upper housing 14 has a cylindrical opening 46 near each corner thereof which has a chamber at its upper portion for purposes to be described.

The operating handle 18 is secured to a rocker member 48 through a press fit of the serrated portion 26 of the operating handle 18 with a bore 50 in the rocker member 48. The rocker member 48 is preferably of a plastic or other insulating material. The rocker member 48 has an upper cylindrical portion and a lower rectangular fulcrum portion 54. The upper cylindrical portion is provided with four radially outward projections 56, each of which receive a contact pin 58. The four upper edges 60 of the fulcrum portion 54 serve as the four pivot axes for the rocker member 48 as will be described.

The pins 58 are each embedded in the projections 56 of the rocker member 48 so as to be rigidly secured thereto. Note that the projections 56 lie at 90 degree circumferential intervals so that the pins 58 are orthogonally disposed with respect to the center line of the switch.

The contact pins 58 each carry a contact spring 62 and a contact 64. The contact spring 62 and the contact 64 are each slidably disposed over the respective contact pin 58. Note that the contact 64 has a through bore 66 for this purpose. The contacts 64 have a somewhat loose fit with contact pins 58, i.e., substantially greater than that necessary for sliding action, for reasons to be described. The movable contacts 64 are labeled 64HA, 64HB, 64VA and 64VB to connote the horizontal A and B contacts and the vertical A and B contacts, respectively. Of course, the horizontal contacts are responsible for right and left adjustments of the mirrors in the horizontal plane while the vertical contacts are responsible for the up and down adjustments of the mirrors in the vertical plane.

The next component part in sequence in FIG. 2 is a contact spacer and upper insulator 68, formed of an insulating material such as plastic, which which will be explained in further detail hereinafter.

Switch 10 includes four output contacts 70 which are orthogonally disposed in positions correlative to the positions of the contacts 64 when the operating handle 18 and rocker member 48 are at rest. The output contacts are labeled 70HA, 70HB, 70VA, and 70VB, to connote the horizontal A and B contacts and the vertical A and B contacts, respectively. The fixed output contacts 70 are disposed on a printed circuit board 72. A fixed supply contact 74 is positioned centrally of the fixed output contacts 70 and is also disposed on the printed circuit board 72. A selector switch contact board 76 is yet additionally disposed on the printed circuit board 72. The selector switch contact board 76 includes two pairs of output contacts 78 and a pair of common or input contacts 79 positioned as shown in the conventional manner of a double-pole, double-throw switch. The output contacts 78 are labeled 78RM and 78LM to connote the contacts connected to the right mirror and left mirrors, respectively. A pair of slidable contacts 80 are connected to the selector switch handle 42 to bridge respective pairs of output contacts 78 with the input contacts 79 of the double-pole, double-throw selector switch 20. The inboard one of each pair of output contacts 78 is connected to the vertical adjustment motor of the respective mirrors while the outboard one of each pair of output contacts 78 is connected to the horizontal adjustment motor of the respective mirrors. The selector switch 20 also includes an upper housing 82 of insulating material such as plastic which contains and guides the handle 42 and slidable contacts 80. The double-pole, double-throw selector switch 20 is of conventional construction.

Returning to the contact space and upper insulator 68, it can be seen that the contact spacer and upper insulator 68 has a through-bore 84 for each fixed output contact 70 and a through bore 86 for the central supply contact 74. The contact spacer and upper insulator 68 also has a cutout 88 to accommodate the selector switch housing 82. Finally, the contact spacer and upper insulator 68 has four upstanding flanges 90 disposed in a circular path which provide orthogonally disposed slots or pathways 92 of slightly greater width than the diameter of contacts 64 which serve to guide the contacts 64 as the switch 10 is operated. To this end, the slots 92 are aligned with the fixed output contacts 70.

A lower insulator 94 mates with the upper contact spacer and insulator 68 to form a compartment which houses the printed circuit board 72, and in part, the selector switch components 76 through 82. The lower insulator 94 has a through-bore 96 for each of the conductors 22. The lower insulator 94 also has appropriate flanges 98 for locating and securing the contact spacer and upper insulator 68.

The lower housing 16 is die-cast of a electrically-conductive material such as zinc. The lower housing 16 generally forms a cavity 100 for containing the contact spacer and upper insulator 68, printed circuit board 72, and lower insulator 94. The lower housing 16 has a through-bore 102 for each of the conductors 22. The diameter of each of the through-bore 102 is approximately the same as the diameter of each of the through-bores 96. When assembled, the center line of each bore 102 is slightly offset from the center line of the correlative bore 96 to provide a strain relief as will be explained. The lower housing 16 also has four upstanding integral rivets 104 which project through the openings 46 in the cover portion 34 of the upper housing 14. The rivets 104 are hollowed at their upper surfaces and are spun over into the chamfers or bores 46 in the upper housing 14 to secure the lower housing 16 to the upper housing 14. The lower housing 16 also has a shoulder 106 with three small projecting spikes (shown in FIG. 11) for engaging the ground foil conductor on the underside of the circuit board 72 to ground the circuit board 72.

Figures 3, 4:
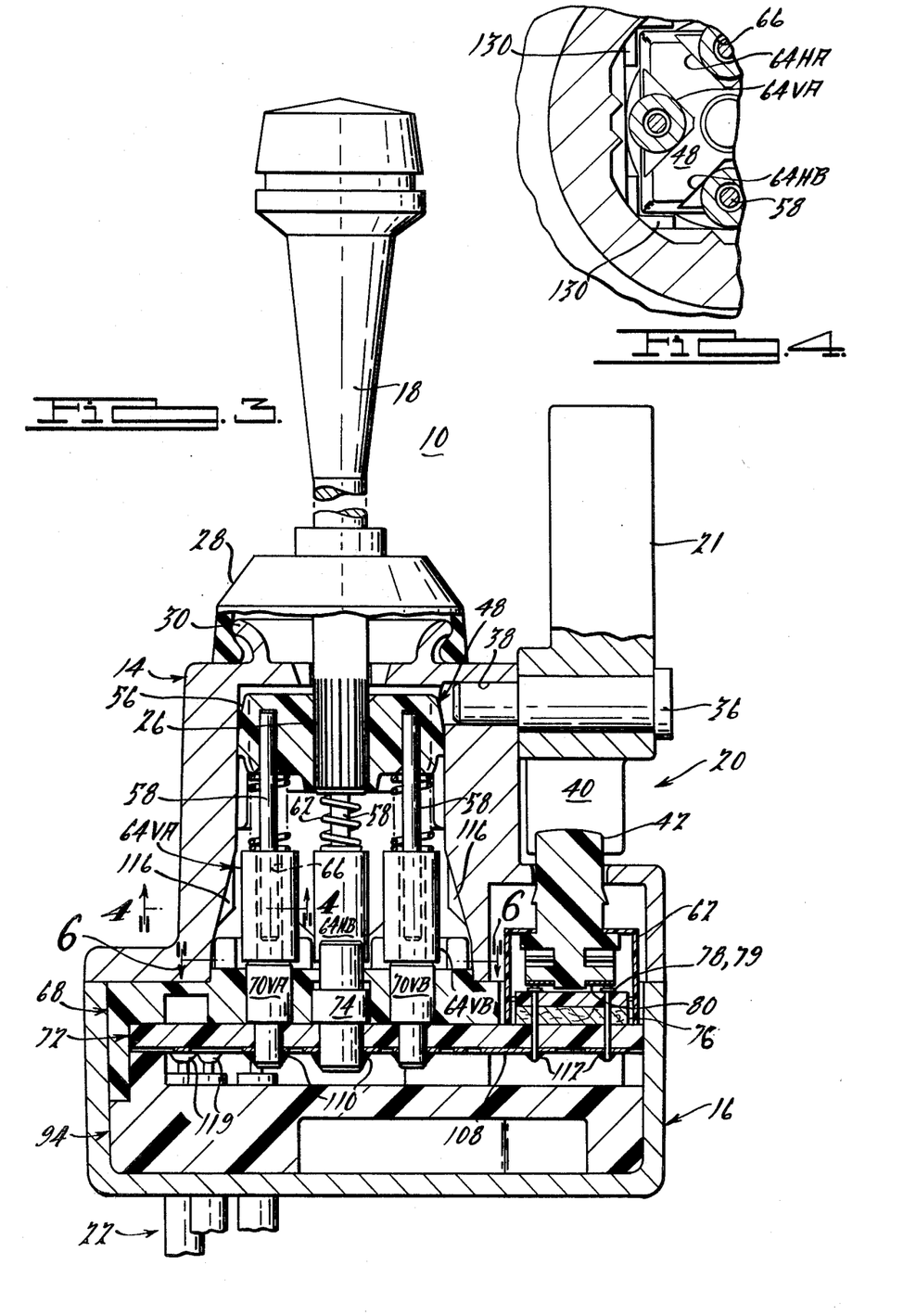
FIG. 3 is a view, partly in cross-section and partly in elevation, of a switch according to the present invention.
FIG. 4 is a cross-sectional view of a portion of the switch according to the present invention taken along the lines 4—4 of FIG. 3.

FIG. 3, a partly cross-sectional view of the switch 10, illustrates the operative position of the switch components described with reference to FIG. 2. Note that the lower serrated portion 26 of the operating handle 18 resides in the rocker member 48. Note also that the contact pins 58 are firmly embedded in the projections 56 of the rocker member 48. It should be noted for the sake of clarity that the middle pin 58 and contact 64HB appear in the drawing to be located on the center line of the switch so as to project from the operating handle 18, but it is not so located. The middle pin 58 and contact 64HB are positioned anteriorly to and spaced from the operating handle 18 and the center line of the switch.

The elastomeric boot 28 tightly engages the operating handle 18 and the flange 30 on the upper housing 14 to provide a good dirt and moisture seal for protecting the internal components of the switch 10.

In the neutral or rest position as illustrated in FIG. 3, the contact springs 62 are in compression and exert a resilient spring force upon the movable contacts 64. In the rest position as shown, it can be seen that each movable contact 64 registers with the correlative fixed output contact 70 and is in electrical engagement solely with that one fixed output contacts 70.

In FIG. 3, note that the fixed output contacts 70 and the central supply contacts 74 each have a reduced diameter lower portion which projects through a respective opening in the printed circuit board 72. The printed circuit board has a conductive foil 108 which is formed in a circuit pattern on its underside (shown in FIG. 10). The contacts 70 and 74 are connected to the foil 108 by solder connection 110 as illustrated. Note that the contact spacer and upper insulator 68 is mated with the lower insulator 94 to encase the circuit board 72. In FIG. 3, it can also be seen that the contacts 78 and 79 of the selector switch project through the contact board 76 and the circuit board 72 to make contact with the foil 108. Those contacts are similarly electrically connected to the foil 108 by solder connections 112 as illustrated. The conductors 22 project through the lower housing 16 and the lower insulator 64 and are electrically connected to the foil 108 at circuit board 72 by solder connections 114 as illustrated. The selector switch components 42, and 78-82 are conventional and will not be explained in detail. Note, however, that the selector switch lever 21 is pivotally secured to the upper housing 14 by the pivot pin 36 so that the lower bifurcated portion 40 of the lever 20 embraces the switch handle 42 so that pivotal movement of the selector switch lever 21 slides the switch handle 42 back and forth in the direction perpendicular to FIG. 3.

As an important feature of this invention, the upper housing 14 serves as one contact of the switch 10. Consequently, only five discrete contacts must be provided as compared to six discrete contacts of prior art switch designs. It should be noted at this point that the die-cast housing is made of a conductive material, i.e., zinc in the preferred embodiment. Although zinc is not normally considered to be a suitable contact material, by virtue of the features of the present invention, it can be so used. Furthermore, zinc is not normally considered to be a desirable electrical conductor. Again, by virtue of the features of the present invention, it can be so used.

Figures 5A, 5B, 6:
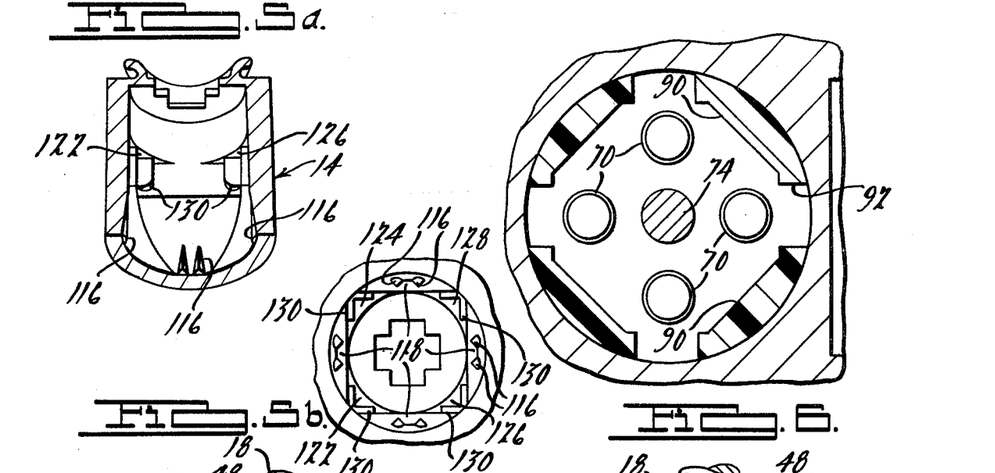
FIGS. 5a and 5b are elevation views of the upper housing of the switch of the present invention looking from below the housing.
FIG. 6 is a partial cross-sectional view of the switch of the present invention taken along the lines 6—6 of FIG. 3 to illustrate the fixed-contacts.

Referring to FIGS. 5a and 5b, the adaptation of the upper housing 14 is illustrated which facilitates its use as a contact and conductor of the switch. The upper housing 14 is provided with four pairs of elongated, triangular, projecting ramps 116. Each pair of projecting ramps 116 forms a V-shaped valley 118 therebetween which is positioned to engage the side portion or barrel portion of a respective contact 64 and to thereby make electrical contact with the side portion of the contact 64.

Figures 7A, 7B:
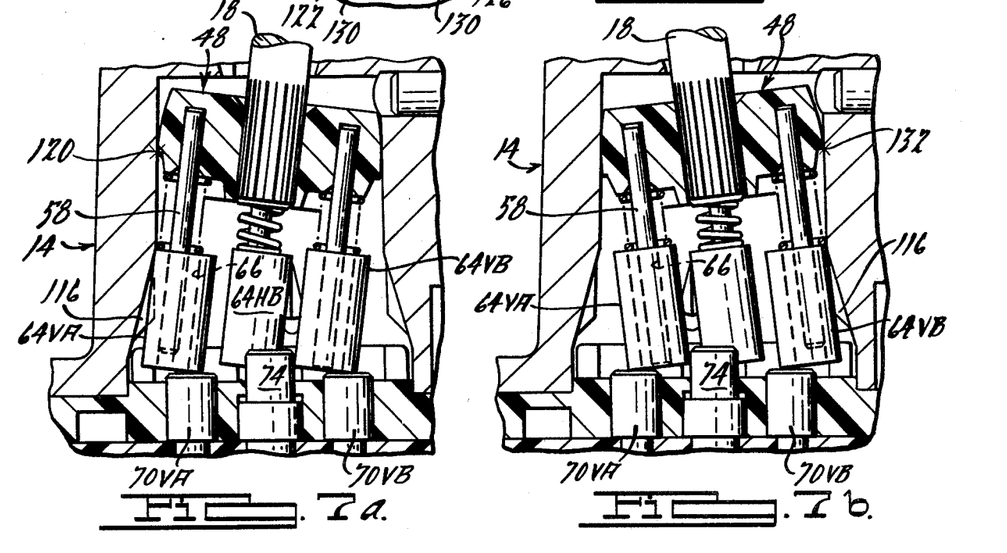
FIGS. 7a and 7b are partial cross-sectional views of the operating mechanism of the switch according to the present invention showing respective operating positions of the movable-contact assembly.

With reference to FIGS. 7a and 7b, note that the movable contact 64 engages the housing 14 substantially above the base of the contact 64, i.e., generally above the mid-point of the contact 64. Note also that there is a significant clarance between the pins 58 and the bores 66 of the contacts 64. This clearance has been found necessary to prevent the contact 64 from lifting off the contact 70 if the vehicle operator places excessive pressure on the operating handle 18. The clearance permits the contact 64 to be angularly misaligned with the pin 58 so that it can remain in engagement with the contact 70 and the upper housing 14 even when the pin 58 is fixed or distorted by excessive force on the operating handle 18. In an exemplary embodiment, the pin had an outside diameter of 0.040/0.041 inches, while the bore 66 of the contact 64 had an inside diameter of 0.052/0.056 inches, resulting in a clearance of 0.011 to 0.016 inches depending on tolerances. In other words, the clearance is approximately one-quarter of the diameter of the pin 58.

The V-shaped valleys 118 are best seen in FIG. 5b. The V-shaped valleys provide a centering action as the contact 64 enters the valley and engages the projections 116. More particularly, it is expected that normal manufacturing and operating variations in the switch will usually cause the contact 64 to enter the V-shaped valley 118 somewhat off center. Thus, the contact will hit one projection 116 before the other. It will then be biased toward the center of the valley 118 causing a wiping action which serves to limit the buildup of oxides during the life of the switch. Any rolling of the movable contacts 64 on the pins 58 is resisted by the frictional engagement of the periphery of the contact 64 with the fixed output contacts 70, the frictional engagement of the contact 64 with the spring 62 and the frictional engagement of the bore 66 of the contact 64 with the pin 58. Consequently, the contact 64 tends to slide along the projections 116 rather than roll along the projections 116. The two projections 116 also provide two points of contact between the projections 116 and the movable contact 64. The second point of contact is redundant and provides the switch with enhanced reliability.

In FIG. 6, the relationship of the fixed output contact 70 and the fixed supply contact 74 can be seen. In the Figure, the upstanding flanges 90 on the contact spacer and upper insulator 68 and the guide passages 92 provided intermediate the flanges 90 can be seen. Notice that each guide passage 92 is radially aligned with a respective fixed output electrode 70 so as to radially guide the movable contacts 64.

Returning now to FIGS. 7a and 7b, the operation of the switch 10 can be best seen. In FIG. 7a, the switch 10 is illustrated with the operating handle 18 having been moved to the right so as to pivot the rocker member 48 about left-side upper edge 60 (shown in FIG. 2) to cause the right portion of the rocker portion 48 to be depressed downwardly. Note that the upper edge 60 is formed by the side and upper surface of the lower square portion 54 of the rocker member 48. The rocker member 48 has four such edges 60, one for each orthogonal direction of movement of the handle 18. The pivotal movement of the rocker member 48 about left-side upper edge 60 is about a pivot axis illustrated at 120 which projects perpendicularly with respect to FIGS. 7a and 7b. The surface upon which left-side upper edge 60 bears during pivotal movement of the rocker 48 is shown in part in FIG. 5a as an inverted ledge at 122. In FIG. 5b, a view looking upwardly from the bottom of the upper housing 14, the surface is shown as comprising inverted ledges 122 and 124. Similar inverted ledges are formed in the right side of the upper housing 14 at 126 and 128 of FIG. 5b. Ledges 122 and 126 also appear in FIG. 5a. Note that the upper housing also has projections 130 which form rectangular pockets for positioning and guiding the rocker member 48. The inverted ledges 122 and 128 about which the upper edges 60 pivot are found interiorly of the pockets formed by the projections 130. In the neutral or rest position, the upper surface of the lower square portion 54 of the rocker member 48 nestles in between the projections 130 and abuts all four inverted ledges 122–128, as can be best seen in FIG. 4.

Referring again to FIG. 7a, when the handle 18 is moved to the right to pivot the rocker member 48 as shown, the movable contact 64VB is moved from a position in registration with the correlative fixed output contact 70VB to a position in which it bridges the fixed output contact 70VB and the supply contact 74 thereby making an electrical connection between the output contact 70VB and the supply contact 74. Conversely, the movable contact 64VA has moved to a position where it bridges the fixed supply contact 70VA and the upper housing 14 at the projections 116 to make an electrical connection between the fixed supply contact 70VA and the housing 14. It should be noted at this time that the upper housing 14 is connected electrically to the vehicle ground (usually battery negative), while the central supply contact 74 is connected to vehicle power (usually battery positive). The forward and rearward movable contacts 64HA and HB are merely shifted to the left but, as can be appreciated from FIG. 6, do not bridge two contacts. Consequently, the forward and rearward movable contacts 64HA and HB are nonfunctional when the operating handle 18 is moved to the right as shown in FIG. 7a.

In FIG. 7b, the operating handle 18 has been moved to the left to rock the rocker member 48 about pivot point 132 formed at the junction between the upper right edge 60 and the inverted ledges 126 and 128 on the upper housing 14 to move the movable contacts 64 as shown. In the position of FIG. 7b, the movable contact 64VA now bridges the fixed output contact 70VA and the central supply contact 74 while the movable contact 64VB now bridges the fixed supply contact 70VB and the upper housing 14 at the projections 116. Consequently, an electrical connection is made between the fixed output contact 70VA and the central supply contact 74 and an additional electrical connection is made between the fixed output contact 70VB and the upper housing 14.

Although right and left motion of the operating handle 18 of the switch 10 is illustrated in FIGS. 7a and 7b, it will be appreciated that back and forth motion of the operating handle 18 will provide correlative shift of the movable contacts 64HA and HB to cause the movable contacts 64HA and HB to bridge the fixed contacts 70HA and HB alternately with the supply contact 74 and the upper housing 14. This further operation will be apparent to one of ordinary skill in the art, and for the sake of brevity, will not be additionally described.

Figure 8A:
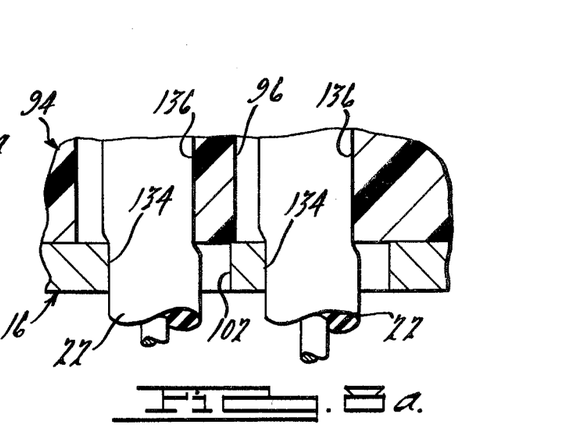
FIGS. 8a and 8b are partial cross-sectional and elevation views, respectively, of the switch according to the present invention illustrating the strain relief provision of this invention.
Figure 8B:
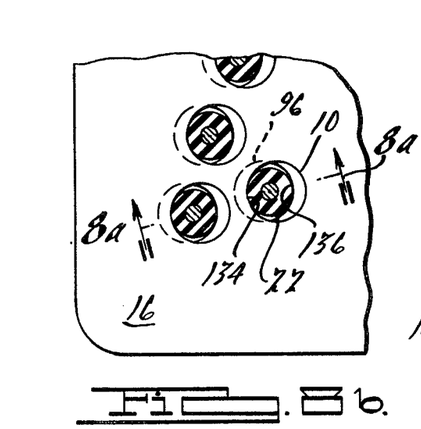

In FIGS. 8a and 8b, the strain relief feature of the present invention is illustrated. In FIG. 8b, some of the conductors 22 are seen projecting through the passages 102 in the lower housing 16 and the passages 96 in the lower insulator 94 for connection to the circuit board 72. Note that each of the bores or passages 96 and 102 are sufficiently greater in diameter than the outer diameter of the conductors 22 so that the conductors 22 will readily pass through those passages. However, note also that the center line of the passages 96 are offset with respect to the center line of the correlative passages 102 so that the conductors 22 are pinched between the lower housing 16 and the lower insulator 94 when the latter are assembled in close fitting relationship as illustrated in FIG. 8a. This pinching action locks the conductors 22 and resists pulls on the conductors 22 which might cause the conductors 22 to be separated from the printed circuit board 72. As can be seen in FIGS. 8a and 8b, The conductors 22 are pinched between the surfaces 134 on lower housing 16 and surfaces 136 on lower insulator 94.

Figures 9, 10, 11:
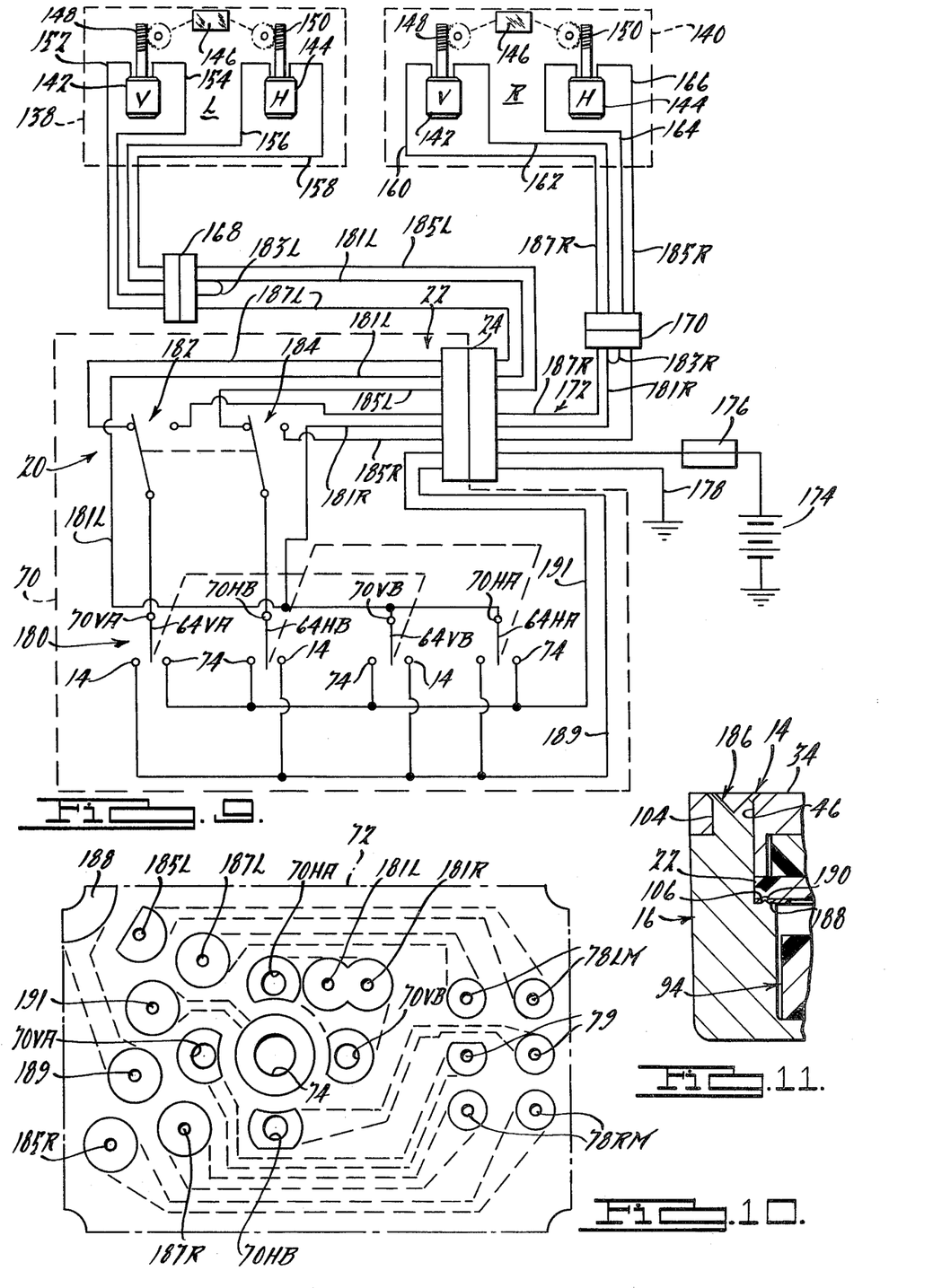
FIG. 9 is a schematic circuit drawing of the switch according to the present invention.
FIG. 10 is an illustration of the printed circuit board of the switch according to the present invention.
FIG. 11 is a partial cross-sectional view of the switch according to the present invention illustrating the manner in which the printed circuit board is grounded.

In FIG. 9a, a typical system for electrically adjusted vehicle mirrors is illustrated. In the system of FIG. 9, a left hand mirror assembly 138 and a right hand mirror assembly 140 are provided. The left hand mirror assembly 138 includes vertical adjustment motor 142 and a horizontal adjustment motor 144, each of which are adapted to adjust a mirror 146 via a suitable drive train 148 and 150, respectively. The vertical adjustment motor 142 provides up and down adjustment of the left mirror assembly 146 in the vertical plane while the horizontal adjustment moto 144 provides right and left adjustment of the left mirror assembly 146 in the horizontal plane. The vertical adjustment motor 142 has a pair of conductors 152 and 154 while the horizontal adjustment motor 144 has a pair of conductors 156 and 158. When conductor 152 is connected to battery negative or vehicle ground and conductor 154 is connected to battery positive, the vertical adjustment motor 142 is driven in one direction, e.g., clockwise, to adjust the mirror 146 in one vertical direction, e.g., down. When conductor 154 is connected to battery negative or vehicle ground and conductor 152 is connected to battery positive, the vertical adjustment motor 142 is driven in the other direction, e.g., counterclockwise, to adjust the mirror 146 in the other vertical direction, e.g., up. Similarly, when conductor 156 is connected to battery negative or vehicle ground and conductor 158 is connected to battery positive, the horizontal adjustment motor 144 is driven in one direction, e.g., clockwise, to adjust the mirror 146 in one horizontal direction, e.g., to the right. Similarly, when conductor 158 is connected to battery negative or vehicle ground and conductor 156 is connected to battery positive, the horizontal adjustment motor 144 is driven in the other direction, e.g., counterclockwise, to adjust the mirror 146 in the other horizontal direction, e.g., to the left. The right hand mirror assembly is provided with similar components which are numbered correspondingly. In the case of the right hand mirror assembly, the vertical adjustment motor 142 is provided with conductors 160 and 162 while the horizontal adjustment motor 144 is provided with conductors 164 and 166. The mirrors 138 and 140 are connected through suitable electrical connectors 168 and 170 to a vehicle wiring harness 172. The vehicle wiring harness 172 is connected to the switch 10 through a connector 24. The connector 24, in addition to connecting the switch 10 to the left mirror assembly 138 and the right mirror assembly 140, also connects the switch 10 to the positive terminal of the vehicle battery 174 via a suitable fuse or circuit breaker 176 and to vehicle ground at 178. Note that the negative terminal of the vehicle battery 174 is also connected to vehicle ground.

In FIG. 9, the switch 10 is illustrated schematically as including the double-pole, double-throw switch 20 and the four-way switch, shown schematically at 180. Briefly stated, the double-pole, double-throw switch 20 connects the four-way switch 180 to either of the left hand mirror assembly 138 or the right hand mirror assembly 140. It is adapted so that it cannot simultaneously connect the four-way switch 180 to both the left hand mirror assembly 138 and the right hand mirror assembly 140. The function of the four-way switch 180 is to connect either the vertical adjustment motor 142 or the horizontal adjustment motor 144 of the selected mirror assembly 138 or 140 to the vehicle power supply 174 and the vehicle ground 178. It is a further function of the four-way switch components 180 to connect the selected adjustment motor 142 or 144 of the selected mirror assembly 138 or 140 in either of two polarity connections of its conductors. The direction of movement of the operating handle 18 determines these connections as described above. Of course, the direction of rotation of the motors 142 and 144, and hence, the direction of vertical adjustment of the mirror 146 is selected thereby.

With moe particular regard to the four-way switch components 180, it can be seen that there is the central power supply contact 74 (illustrated at four locations for schematic purposes) and the ground contact of the upper housing 14 (also shown at four locations for schematic purposes). Also shown in the Figure are the fixed output contacts 70 and the movable contcts 64. Note that the movable contact 64VA is mechanically connected to the movable contact 64VB and that the movable contact 64HA is mechanically connected to the movable contact 64HB. Consequently, when movable contact 64VA is moved to the left in FIG. 9, corresponding to movement to the left in FIG. 7a, electrical contact is made between output contact 70VA and and the housing 14 while at the same time electrical contact is made between the output contact 70VB and the power supply contact 74. These connections cause the vehicle ground to be connected through switch 182 of the double-pole, double-throw switch 20 to conductor 152 of vertical motor 142 and battery positive to be connected through line 181L and jumper 183L to conductor 154 of horizontal motor 142 to move the left mirror 146 down. Upward movement of the left mirror 146 is accomplished by moving the handle 18 to the left as shown in FIG. 7b which causes the contacts 64VA and 64VB to move to the right, with respect to FIG. 7b and FIG. 9 to cause contact 64VA to engage the central power supply contact 74 and contact 64VB to engage the housing 14. These connections cause vehicle positive to be connected through switch 182 to conductor 152 of the vertical adjustment motor 142 and vehicle negative or ground to be connected via jumper 183L to conductor 154 of vertical motor 142 to move the mirror 146 up. Leftward movement of the mirror 146 is accomplished by moving the handle 18 to the left which causes movable contact 64HA to engage central supply contact 74 and movable contct 64HB to engage the housing 14. This corresponds to a movement of the contacts 64HA and 64HB to the right in FIG. 9. Such movement causes the vehicle positive power supply to be connected via conductor 181 to conductor 156 of the horizontal adjustment motor 144 and vehicle negative or ground through switch 184 and conductor 185 to conductor 158 of the horizontal adjustment motor 144 to move the mirror 146 to the left. Rightward adjustment of the mirror 146 is accomplished by moving handle 18 to the right as illustrated in FIG. 2 to move movable contact 64HB into engagement with the central supply contact 74 and movable contact 64HA into engagement with the housing 14 to connect conductor 158 of horizontal adjustment motor 144 to vehicle positive through switch 184 and conductor 185 and conductor 156 of horizontal adjustment motor 144 to vehicle negative or ground through conductor 181.

Right mirror 140 is adjusted similarly by moving the contacts of the double-pole, double-throw switch 20 to the right as will be appreciated by those skilled in the art. Note that corresponding numerals with the suffix R have been applied to the conductors for the right mirror. For the sake of brevity, the description of the adjustment of the right mirror 40 will not be repeated.

In FIG. 10, the circuit board 72 is illustrated as it appears looking from the bottom of the switch. The circuit board 72 is labelled correlative to the schematic diagram of FIG. 9. The conductor portions illustrated by solid lines are the portions thereof which are exposed for solder connections. The portions of the conductors which are illustrated by dashed lines are the portions thereof which lie beneath an insulating material conventionally used in circuit boards to prevent the adherence of solder to those conductors. Additionally, the position of the fixed output contact 70 and the central supply contact 74 are depicted. Shown to the right of the circuit board 72 are the six connections for contacts 78 and 79 of the double-pole, double-throw switch 20. In FIG. 10, the point of connection for the conductors 185R and 185L, 187R and 187L, 189 and 191R and 191L are illustrated. Conductor 189 is the ground conductor and connects to a foil 188 disposed at the one corner of the circuit board 72.

Referring now to FIG. 11, it can be seen that a portion of the lower housing 16 is shown joined to cover portion 34 of the upper housing 14. Note the flared connection of the pin 104 with the chamber on the bore 46 of the upper housing 14, illustrated at 186 which serves to connect the lower housing 16 to the upper housing 14 and to provide a good ground electrical connection. The flared connection 186 assures good electrical contact between the upper housing 14 and the lower housing 16.

The grounding of the circuit board 72 can be seen in FIG. 11. The circuit board 22 is illustrated with the ground conductor 188 shown on the lower left hand surface of the circuit board 22. The ground conductor 188 makes electrical contact with the shoulder 106 on the lower housing 16. The shoulder is provided with three sharp triangular projections 190 which indent and/or pierce the ground conductor foil 188 to insure a good electrical contact between the lower housing 16 and the circuit board 22. Since the lower housing 16 is electrically connected to the upper housing 14, the upper housing 14 is also grounded via the foil 188 and ground conductor 189.

Figures 12, 13, 14, 15:
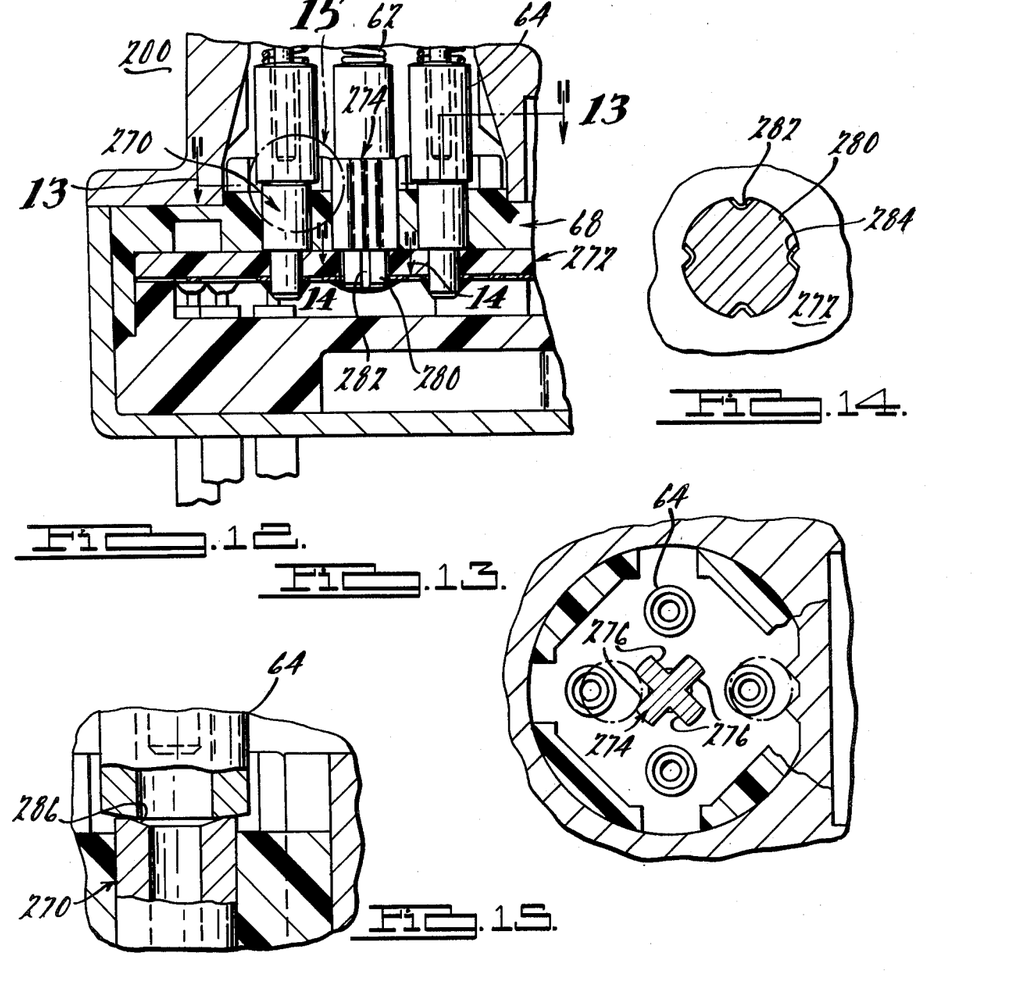
FIG. 12 is a cross-sectional view of an alternative embodiment of the present invention.
FIG. 13 is a cross-sectional view taken of the alternative embodiment of FIG. 12 taken along line 13—13.
FIG. 14 is a cross-sectional view of a portion of the alternative embodiment of FIG. 12 taken along line 14—14.
FIG. 15 is a cross-sectional view of a portion of the alternative embodiment of FIG. 12 taken from the encircled portion 15 thereof.
Figure 16:
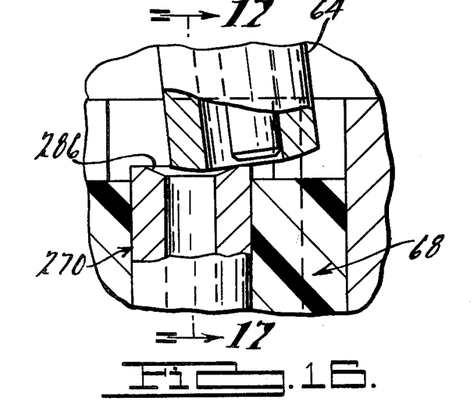
FIG. 16 is a cross-sectional view of a portion of the alternative embodiment of FIG. 12 taken from the encircled portion 15 thereof showing the contact in an operating position.
Figure 17:
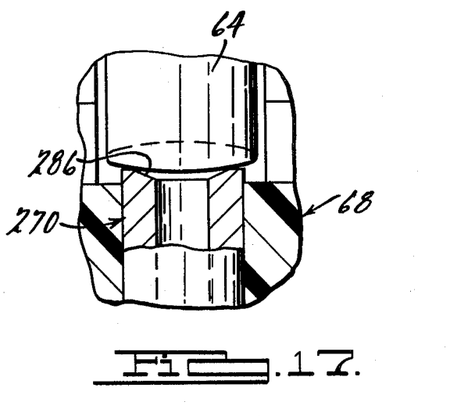
FIG. 17 is a view of a porton of the alternate embodiment of FIG. 12 also showing the movable contact in an operating position providing two points of engagement with the fixed contact.

In FIG. 12, an alternative embodiment 200 of a switch according to the present invention is iilustrated. The switch 200 differs principally in the configuration of the fixed output contacts 270 and the central supply contact 274. The remaining components of the switch 200 are essentially like the conponents of the switch 10 and are therefore given similar numerals. The configuration of the central contact 274 can be best seen in FIG. 13. The upper portion of the contact 274 has a cruciform cross-section so as to provide four V-shaped valleys 276 with each valley 276 aligned with a respective one of the fixed output contacts 270. The central supply contact 274 extends sufficiently above the contact spacer and upper insulator 68 so that each movable contact 64 will be guided into the respective valley 276 when the operating handle 18 is moved in a direction to bring the contact into engagement with the converging walls of the valleys 276.

As the movable contact 64 enters the valley 276 of the central supply contact 274, it will tend to hit one wall of the valley before the other. It will then slide along that wall until it engages the other wall. This sliding movement tends to counter detrimental oxide buildup. Moreover, when the second wall of the valley 276 is engaged, a redundant point of contact is provided to enhance the reliability of the switch 200. It should be noted that, on some occasions, both walls of the valley will be engaged simultaneously or nearly simulaneously. However, due to variations in manufacturing tolerances and variations in the direction of movement of the handle 18, it is likely that in most instances, one converging wall of the valley 276 will be engaged before the other thereby providing the beneficial wiping action.

Note that each valley 276 is radially aligned with respective movable contact 64 and fixed contacts 270. This alignment is assured by an interlocking relationship between the base 280 of the central supply contact 274 and the printed circuit board 272. Note that the base 280 of the central supply contact 274 is provided with four equally spaced notches 282 which mate with four similarly-sized, equally-spaced projections 284 in the printed circuit board 272, as best seen in FIG. 14. Consequently, the central supply contact 274 is properly aligned upon assembly with the printed circuit board 272.

In FIG. 15, the special configuration of the fixed output contacts 270 can be seen. The fixed output contacts 270 are provided with an inward chamfer 286 which results in a dished upper contact surface. The chamfer may be, for example, 15 degrees. Because of the chamber 286, the sliding contact 64 engages the upper surface of the fixed output contact 270 at two points when it is displaced into bridging engagement between the fixed output contact 270 and the central supply contact 274.

The two points of contact resulting from the dished upper contact surface can best be appreciated by example. Firstly, it should be understood that the dished upper surface of the fixed output contact 270 provides that surface with a quasi-spherical form of a determinable diameter. Furthermore, the outer edge of the movable contact 64 is a circular form of determinable diameter. By way of illustration, one should consider the engagement between the edge circle on a movable contact 64 and the spherical upper surface of a fixed contact 270 when the diameter of the circle is less than the diameter of the sphere. In that event, the movable contact 64 would engage the spherical dish of the fixed contact 270 at only one point. If, for example, the diameter of the edge circle of the movable contact 64 was the same as the diameter of the spherical surface of the fixed output contact 270, presuming proper alignment of the two contacts, the contact between the two would be a line contact, i.e., with the two surfaces perfectly mating. As a final example, if the diameter of the edge circle of the movable contct 64 is greater than the diameter of the spherical dish of the fixed output contact 270, the circular edge of the movable contact 64 would not fit into the spherical dished surface, but rather, would rest on top of the spherical dished surface engaging it at two points along the periphery of the spherical dished surface. It is this latter example which is applicable to the construction of the switch 200.

It has been found that it is not necessary to form the upper surface of the contact 270 into a perfect sphere. It is only necessary to chamfer the upper surface of the fixed contact 270 so that it falls below the edge circle of the movable contact 64 when the movable contact 64 is in its tilted bridging position during operation of the switch. In that event, since the diameter of the fixed output contact 270 is less than the diameter of the edge circle of the movable contact 64, and the central portion of the upper surface of the contact 270 falls below the edge circle of the movable contact 64, the edge circle of the movable contact 64 will engage the fixed output contact 270 at two points near its periphery. These two points, as previously explained, provide a redundant point of contact which enhances the reliability of the switch 200. Moreover, there is a sliding action as the movable contact 64 is tilted into the bridging position which minimizes the deleterious buildup of oxides. This sliding action occurs in part due to unavoidable slight misalignment between the path of the contact 64 and the respective fixed contact 270 to cause engagement of the edge circle of contact 64 with the fixed contact 270 at one peripheral side before the other and in part due to the sliding motion of the contact 64 as it moves into a bridging position.

In view of the above description, it can be seen that each point of contact between the movable contacts 64 and the fixed contacts 274 and 14 of the switch 200 results in two points of contact with one point being redundant. Moreover, each point of contact is ordinarily achieved by a sliding action which reduces the buildup of oxides. For those reasons, the switch 200 has enhanced reliability over the prior art switches.

FIG. 18 is an alternative embodiment of a portion of the switch 10 and 200. In FIG. 18, the housing of the double-pole, double-throw switch 82 has been integrated into the upper insulator 68 to form a composite upper insulator 368. Otherwise, the components of the alternative embodiment of FIG. 18 are the same as the embodiments 10 and 200 and are given like numbers with the prefix "3". The embodiment of FIG. 18 is preferred for high volume applications of the switch 10. Also, in the embodiment of FIG. 18, the double-pole, double-throw fixed contacts 78 and 79 are embedded directly in the printed circuit board 72 without use of a contact board 76 as illustrated in FIG. 2.

It is to be understood that the foregoing description is that of preferred embodiments of the invention. Various changes and modifications may be made without departing from the spirit and scope of the invention as defined by the appended claims.

What is claimed is:

1. A switch assembly for connecting an electrically-operated device to a supply of electrical power comprising:
    a housing for said switch including at least one conductive portion forming both interior and exterior walls of said switch assembly, said exterior wall of said housing portion being adapted to be connected to said power supply and said interior wall of said one portion being configured so that said interior wall of said one portion functions as a conductive contact for said switch;
    a fixed contact disposed within said interior wall of said housing portion and being adapted to be connected to said electrically-operated device;
    a movable contact; and
    means for moving said movable contact for causing said movable contact to be moved from a first position in which it does not bridge said fixed contact and said interior wall of said housing portion to a second position in which it bridges and electically connects said fixed contact and said interior wall of said housing portion for connecting said electrically-operated device to said power supply.

2. A switch assembly for connecting an electrically-operated device to a supply of electrical power comprising:
    a housing for said switch including at least one portion comprising predetermined interior and exterior walls of said switch assembly and constructed of a conductive material, and said housing portion being adapted to be connected to said power supply;
    a fixed contact disposed within said interior wall of said housing portion and being adapted to be connected to said electrically-operated device;
    a movable contact,
    means for moving said movable contact for causing said movable contact to be moved from a first position in which it does not bridge said fixed contact and said housing portion to a second position in which it bridges and electrically connects said fixed contact and said housing portion for connecting said electrically-operated device to said power supply; and
    said interior wall of said housing portion is configured to provide two wall portions confronting said movable contact and adapted so that when said movable contact is moved from said first position to said second position, said movable contact, at least at times, engages one of said wall portions before the other of said wall portions and slides along said one wall portion until said movable contact engages said other wall portion.

3. The switch assembly according to claim 2 wherein said wall portions converge in the direction of movement of said movable contact when said movable contact is moved from said first position to said second position.

4. The switch assembly according to claim 1 wherein said movable contact is an elongated contact member having a bottom surface and a side surface and in which said bottom surface engages said fixed contact and said side surface engages said interior wall of said housing portion when said movable contact is in said second position.

5. The switch assembly according to claim 4 wherein said side surface of said elongated contact member engages said interior wall of said housing portion at a location substantially above said bottom surface.

6. The switch assembly according to claim 5 wherein said elongated contact member is a cylindrical member having an axial bore; and wherein said means for moving said movable contact includes a contact pin extending into said bore for moving said movable contact from said first position to said second position, said bore having a diameter substantially greaer than the diameter of said pin to allow angular movement of the axis of said movable contact member relative to the axis of said pin.

7. The switch asembly according to claim 1 wherein the upper surface of said fixed contact is dished interiorly of the periphery thereof and wherein said movable contact engages said upper surface of said fixed contact at two points along the periphery thereof when said movable contact is in said second position.

8. The switch assembly according to claim 1 wherein said movable contact is cylindrically-shaped and has a lower circular periphery; and wherein said fixed contact is also cylindrically-shaped and has an upper surface which is dished interiorly of the upper circular periphery thereof, the diameter of said fixed contact being sufficiently less than the diameter of said movable contact such that said movable contact engages said fixed contact at two locations on said fixed contact near said upper periphery when said movable contact is in said second position.

9. The switch assembly according to claim 1 wherein said power supply has two terminals, said housing portion being connected to one of said terminals so that said device is connected to said on terminal when said movable contact is in said second position; said switch assembly further comprising a supply contact disposed witthin said interior wall of said housing portion and being adapted to be connected to the other of said terminals of said electrical power supply, said means for moving said terminals of said electrical power supply, said means for moving said movable contact also being adapted for moving said movable contact from said first position to a third position in which said movable contact bridges and electrically connects said fixed contact and said supply contact for connecting said device to the other terminal of said power supply when said movable contact is in said third position.

10. The switch assembly according to claim 9 wherein said fixed supply contact is configured to provide two wall portions confronting said movable contact and adapted so that when said movable contact is moved from said first position to said third position, said movable contact, at least at times, engages one of said wall portions before the other of said wall portions and slides along said one wall portion until said movable contact engages said other wall portion.

11. The switch assembly according to claim 10 wherein said wall portions of said fixed supply contact converge in the direction of movement of said movable contact when said movable contact is moved from said first position to said third position.

12. A switch assembly for connecting first and second terminals of an electrically-operated device to positive and negative terminals of a power supply in a manner to provide either a connection of a first polarity in which said first terminal is connected to said positive terminal and said second terminal is connected to said negative terminal or a connection of a second polarity in which said second terminal is connected to said positive terminal and said first terminal is connected to said negative terminal, said switch comprising:
  a housing for said switch including at least one conductive portion forming both interior and exterior walls of said switch assembly, said exterior wall of said housing portion being adapted to be connected to one of said power supply terminals and said interior wall of said one portion being configured so that said interior wall of said one portion functions as a conductive contact for said switch;
  a pair of fixed output contacts disposed within said interior wall of said housing portion, a first of said pair of fixed output contacts being adapted to be connected to said first terminal of said device and a second of said pair of fixed output contacts being adapted to be connected to said second terminal of said device;
  a supply contact disposed interiorly of said pair of fixed contacts and being adapted to be connected to the other of said power supply terminals;
  a pair of movable contacts, each being correlative to a respective one of said fixed output contacts;
  a contact operating member connected to said movable contacts for moving said movable contacts in two directions so that upon movement of said movable contacts in a first of said two directions, one of said pair of movable contacts is caused to bridge and electrically connect its correlative one of the fixed output contacts and said interior wall of said housing portion and the other of said pair of movable contacts is caused to bridge and electrically connect its correlative one of said fixed output contacts and said supply contact, and so that upon movement in a second of said two directions, said one of said pair of movable contacts is caused to bridge and electrically connect its correlative one of said fixed output contacts and said supply contact and said other of said pair of movable contacts is caused to bridge and electrically connect its correlative one of said fixed output contacts and said interior wall of said housing portion, whereby movement of said pair of movable contacts in said first direction causes a connection of one of said first and second polarities and movement of said movable contacts in said second direction causes a connection of the other of said first and second polarities.

13. The switch assembly according to claim 12 further including a second pair of fixed output contacts disposed within said interior walls of said housing portion, a first of said second pair of fixed contacts being adapted to be connected to one terminal of an electrically-operated device and a second of said second pair of said fixed output contacts being adapted to be connected to another terminal of an electrically-operated device; said switch assembly further including a second pair of movable contacts, each being correlative to a respective one of said fixed output contacts of said second pair of fixed output contacts; said contact operating member also being connected to said second pair of said movable contacts for moving said second pair of movable contacts in third and fourth directions so that upon movement of said movable contacts in said third direction, one of said second pair of movable contacts is caused to bridge and electrically connect its correlative one of said second pair of fixed output contacts and said housing portion and the other of said second pair of movable contacts is caused to bridge and electrically connect its correlative one of said fixed output contacts and said supply contact, and so that upon movement in said fourth direction, one of said second pair of movable contacts is caused to bridge and electrically connect its correlative one of said second pair of fixed output contacts and said supply contact and said other of said second pair of movable contacts is caused to bridge and electrically connect its correlative one of said second pair of fixed output contacts and said housing portion.

14. The switch assembly according to claim 13 wherein said interior wall of said housing portion is configured to provide two wall portions confronting each of said movable contacts and adapted so that when each of said movable contacts is moved in a direction to cause electrical connection with said housing portion, said each movable contact, at least at times, engages one of said wall portions before the other of said wall portions and slides along said one wall portion until said each movable contact engages said other wall portion.

15. The switch assembly according to claim 14 wherein said wall portions engaged by said each movable contact converge in the direction of movement of said each movable contact when said movable contact is moved into electrical engagement with said housing portion.

16. The switch assembly according to claim 15 wherein each of said movable contacts is an elongated contact member having a bottom surface and a side surface and in which said bottom surface engages its correlative one of said fixed oiutput contacts and said side surface engages said interior wall of said housing portion when said each movable contact bridges and electrically connects its correlative one of said fixed output contacts and said housing portion.

17. The switch assembly according to claim 16 wherein said side surface of each of said elongated contact members engages said interior wall of said housing portion at a location substantially above its bottom surface.

18. The switch assembly according to claim 13 wherein said supply contact is configured to provide two wall portions confronting each of said movable contacts and adapted so that when said each movable contact is moved in a direction to cause electrical connection with said supply contact, said each movable contact, at least at times, engages one of said wall portions before the other of said wall portions and slides along said wall portion until said each movable contact engages said other wall portion.

19. The switch assembly according to claim 18 wherein said wall portions of said fixed supply contact converge in the direction of movement of said each movable contact when said each movable contact is moved in a direction to cause electrical connection with said supply contact.

20. The switch assembly according to claim 19 wherein said supply contact is cruciform-shaped providing four sets of converging walls, with one such set being aligned in the direction of each of said movable contacts and comprising said wall portions.

21. The switch assembly according to claim 13 wherein each of said movable contact is an elongated contact member having a bottom surface and a side surface and in which said bottom surface engages the respective one of said fixed contacts and said side surface engages said interior wall of said housing portion when said each movable contact bridges and electrically connects said respective one of said fixed contacts and said housing portion.

22. The switch assembly according to claim 21 wherein said side surface of said elongated contact member engages said interior wall of said housing portion at a location substantially above said bottom surface.

23. The switch assembly according to claim 22 wherein said each elongated contact member is a cylindrical member having an axial bore; and wherein said means for moving said movable contacts includes a contact pin extending into said bore for moving said each movable contact into bridging electrical connection between said respective one of said fixed contacts and said interior wall of said housing portion, said bore having a diameter substantially greater than the diameter of said pin to allow angular movement of said each axis of the movable contact member relative to the axis of said pin.

24. The switch assembly according to claim 23 wherein the upper surface of each of said fixed contacts is dished interiorly of the periphery thereof and wherein said each respective movable contact engages said upper surface of said fixed contact at two points along the periphery thereof when said each respective movable contact bridges and electrically connects said fixed contact and said housing portion and when said each respective movable contact bridges and electrically connects said fixed contact and said supply contact.

25. The switch assembly according to claim 24 wherein said each movable contact is cylindrically-shaped and has a lower circular periphery; and wherein said each fixed contact is also cylindrically-shaped and has an upper surface which is dished interiorly of the upper circular periphery thereof, the diameter of said each fixed contact being sufficiently less than the diameter of said each movable contact such that said each movable contact engages said respective fixed contact at two locations near said upper periphery of said respective fixed contact when said each movable contact bridges and electrically connects said each respective fixed contact and said housing portion and when said each movable contact bridges and electrically connects said each respective fixed contact and said supply contact.

26. The switch assembly according to claim 23 wherein said switch assembly is adapted to be associated with a motor vehicle having a battery with said positive and negative terminals, one of said battery terminals being connected to vehicle ground; and wherein said housing portion is adapted to be connected to vehicle ground and said supply terminal is adapted to be connected to the other of said battery terminals.

27. A switch assembly for connecting first and second terminals of an electrically-operated device to positive and negative terminals of a power supply in a manner to provide either a connection of a first polarity in which said first terminal is connected to said positive terminal and said second terminal is connected to said negative terminal or a connection of a second polarity in which said second terminal is connected to said positive terminal and said first terminal is connected to said negative terminal, said switch comprising:

a housing for said switch including at least one portion comprising predetermined interior and exterior walls of said switch assembly and constructed of an electrically conductive material, said housing portion being adapted to be connected to one of said power supply terminals;

a pair of fixed output contacts disposed within said interior wall of said housing portion, a first of said pair of fixed output contacts being adapted to be connected to said first terminal of said device and a second of said pair of fixed output contacts being adapted to be connected to said second terminal of said device;

a supply contact disposed interiorly of said pair of fixed contacts and being adapted to be connected to the other of said power supply terminals;

a pair of movable contacts, each being correlative to a respective one of said fixed output contacts;

a contact operating member connected to said movable contacts for moving said movable contacts in two directions so that upon movement of said movable contacts in a first of said two directions, one of said pair of movable contacts is caused to bridge and electrically connect its correlative one of the fixed output contacts and said interior wall of said housing portion and the other of said pair of movable contacts is caused to bridge and electrically connect its correlative one of said fixed output contacts and said supply contact, and so that upon movement in a second of said two directions, said one of said pair of movable contacts is caused to bridge and electrically connect its correlative one of said fixed output contacts and said supply contact and said other of said pair of movable contacts is caused to bridge and electrically connect its correlative one of said fixed output contacts and said housing portion, whereby movement of said pair of movable contacts in said first direction causes a connection of one of said first and second polarities and movement of said movable contacts in said second direction causes a connection of the other of said first and second polarities; and said interior wall of said housing portion is configured to provide two wall portions confronting each of said movable contacts and adapted so that when each of said movable contacts is moved in a direction to cause electrical connection with said housing portion, said movable contact, at least at times, engages one of said wall portions before the other of said wall portions and slides along said one wall portion until said movable contact engages said other wall portion.

28. The switch assembly according to claim 27 wherein said wall portions engaged by said movable contact converge in the direction of movement of said movable contact when said movable contact is moved into electrical engagement with said housing portion.

29. The switch assembly according to claim 28 wherein each said movable contact is an elongated contact member having a bottom surface and a side surface and in which said bottom surface engages its correlative one of said fixed output contacts and said side surface engages said interior wall of said housing portion when said movable contact bridges and electrically connects its correlative one of said fixed output contacts and said housing portion.

30. The switch assembly according to claim 29 wherein said side surface of each of said elongated contact members engages said interior wall of said housing portion at a location substantially above its bottom surface.

31. A switch assembly for connecting an electrically-operated device to a supply of electrical power comprising:
an electrical conductor for said switch;
a housing for said switch having an opening therethrough for freely receiving said conductor said housing opening being aligned along a predetermined first axis;
a clamping member adapted to mate with said housing and having an opening therethrough for freely receiving said conductor correlative to said opening in said housing, said clamping member opening being aligned along a predetermined second axis;
said housing and said clamping member being configured so that said first and second axes of said respective openings for said conductor are generally parallel but sufficiently partially-misaligned upon mating of said housing and said clamping member and so that the walls of said clamping member opening and said housing member opening forcibly engage opposite sides of said conductor when said clamping member and said housing are mated to thereby clamp said conductor.

32. The switch assembly according to claim 31 wherein said switch assembly is provided with a plurality of conductors; and said housing and said clamping member is provided with correlative sets of openings therethrough for each of said plurality of conductors, each respective set of openings in said housing member and said clamping member having axes which are generally parallel but partially misaligned upon mating of said housing and said clamping member and so that the walls of said clamping member opening and said housing opening forcibly engage opposite sides of each of said conductors when said clamping member and said housing are mated to thereby clamp each of said conductors.

33. A switch assembly for connecting an electrically-operated device to a supply of electrical power comprising:
a conductive exterior and interior housing for said switch;
a printed circuit board within said housing having a conductor adapted to be connected to said power supply, said conductor extending to a predetermined location on said circuit board; and
clamping means for clamping said circuit board to said housing;
said housing being configured to engage said conductor on said circuit board at said predetermined location so that said clamping of said circuit board to said housing electrically connects said conductor and said housing.

34. The switch assembly according to claim 33 wherein said predetermined conductor extends adjacent the periphery of said circuit board and said predetermined location is adjacent the periphery of said circuit board; said clamping means clamping said circuit board to said housing at said predetermined location.

35. The switch assembly according to claim 33 wherein said switch includes a movable contact and at least two fixed contacts, said housing comprising one of said fixed contacts.

36. The switch assembly according to claim 35 wherein said movable contact and said other fixed contact are disposed interiorly of said housing.

* * * * *